Aug. 7, 1934.   L. A. SHARP   1,969,043
UNDERFLOOR ELECTRICAL DISTRIBUTION SYSTEM AND Y FITTING THEREFOR
Filed April 17, 1930   6 Sheets-Sheet 1
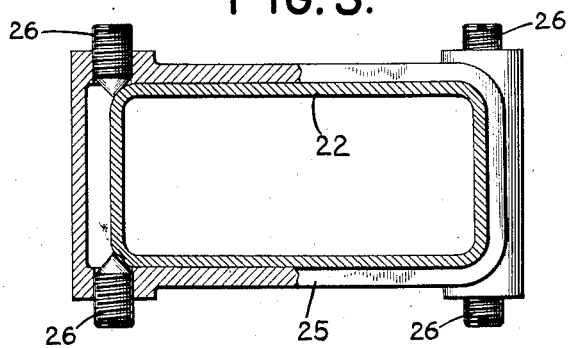
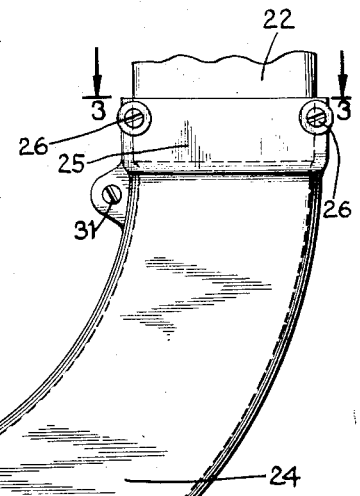
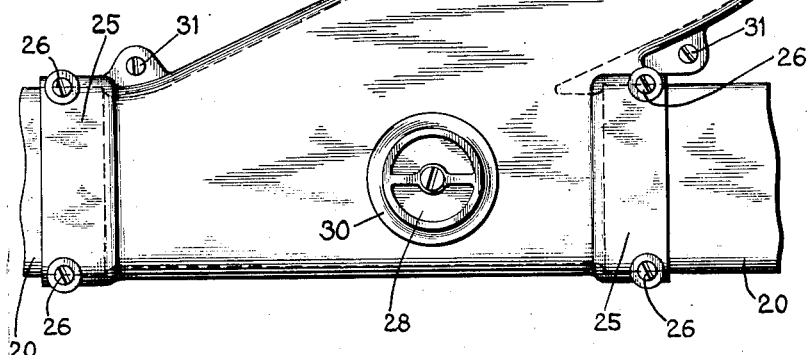
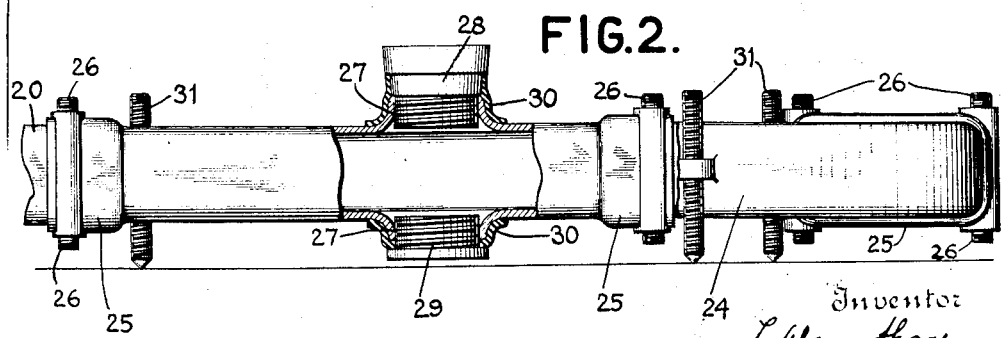

Aug. 7, 1934.  L. A. SHARP  1,969,043

UNDERFLOOR ELECTRICAL DISTRIBUTION SYSTEM AND Y FITTING THEREFOR

Filed April 17, 1930   6 Sheets-Sheet 2

Aug. 7, 1934.    L. A. SHARP    1,969,043
UNDERFLOOR ELECTRICAL DISTRIBUTION SYSTEM AND Y FITTING THEREFOR
Filed April 17, 1930    6 Sheets-Sheet 3

Inventor
L. Alan Sharp
By his Attorneys
Cooper, Kerr & Denham

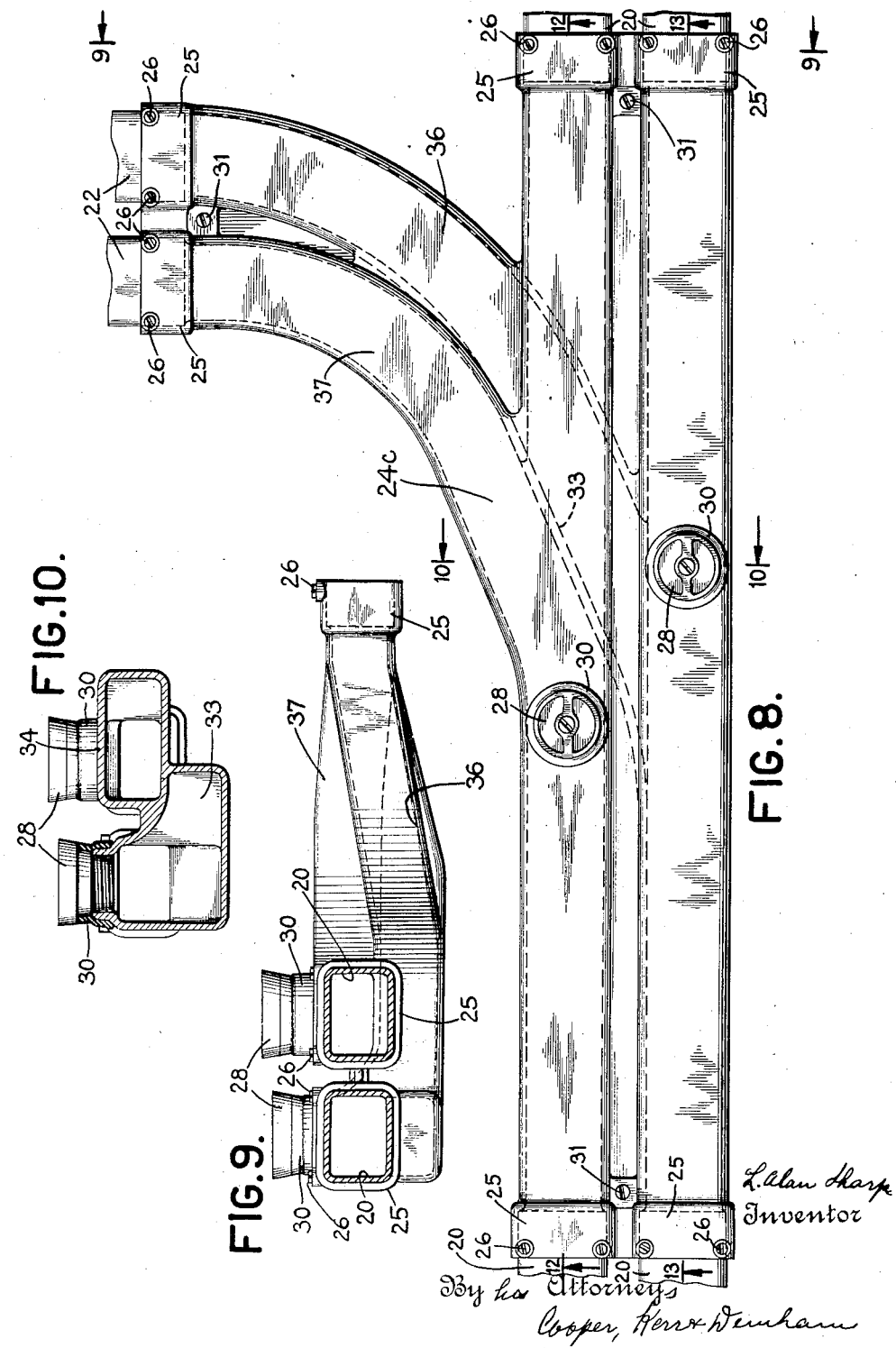

Aug. 7, 1934.  L. A. SHARP  1,969,043
UNDERFLOOR ELECTRICAL DISTRIBUTION SYSTEM AND Y FITTING THEREFOR
Filed April 17, 1930   6 Sheets-Sheet 5
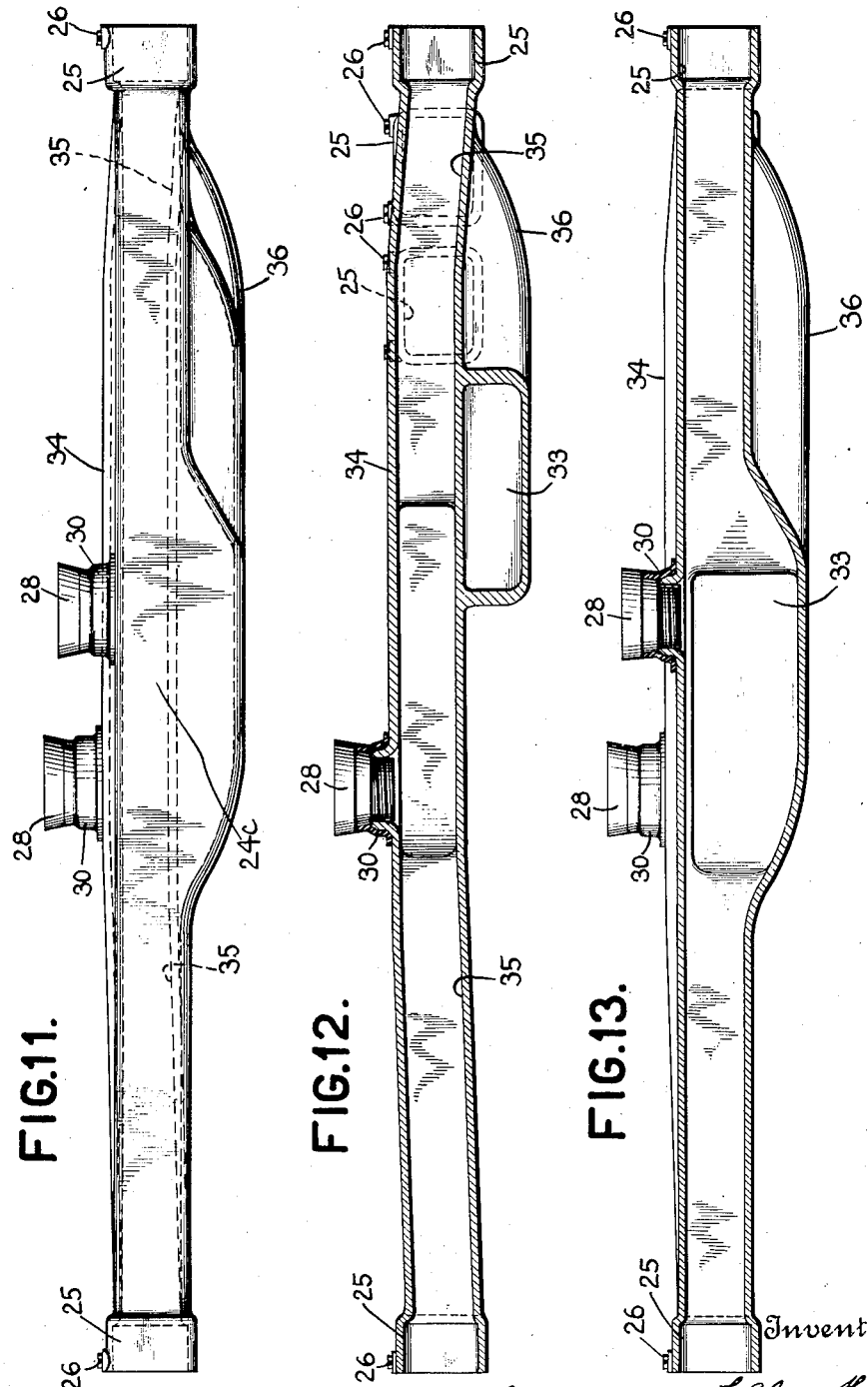

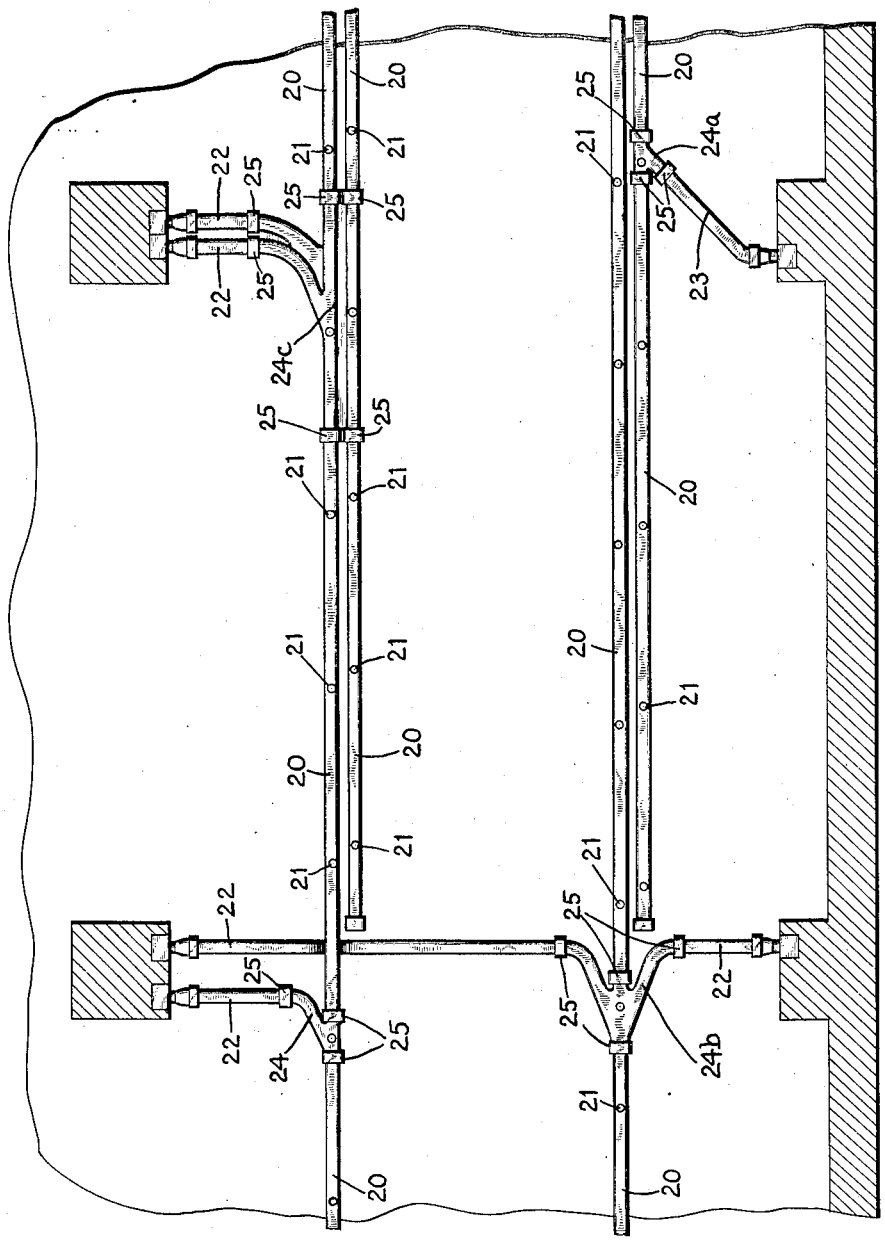

Patented Aug. 7, 1934

1,969,043

UNITED STATES PATENT OFFICE 1,969,043

UNDERFLOOR ELECTRICAL DISTRIBUTION SYSTEM AND Y FITTING THEREFOR

L. Alan Sharp, Avalon, Pa., assignor to National Electric Products Corporation, New York, N. Y., a corporation of Delaware Application April 17, 1930, Serial No. 444,892

2 Claims. (Cl. 247—31)

With underfloor systems for electrical distribution it is frequently desirable to provide systems of conduits in which certain ducts run at right angles to other ducts and join with them at intersecting points.

Heretofore junction of one set of ducts with other ducts extending at right angles thereto has been effected by providing expensive floor junction fittings, which junction fittings have visible metal coverings which project up to the floor. Such junction boxes have heretofore been considered necessary for fishing purposes since it is difficult to cause a wire to be diverted from a straight line into a duct at a right angle.

The present invention is directed to the provision of an improved duct system in which the use of floor junction fittings is obviated. In lieu of using such floor junction boxes branch fittings are employed which branch fittings have a substantially Y configuration so that fishing from one duct to a duct extending at right angles thereto is facilitated.

Further objects of the present invention reside in the provision of branch fittings which are adapted for reversal when desired.

Further objects of the invention will be hereinafter set forth in the accompanying specification and claims and shown in the drawings, which by way of illustration show what I now consider to be a preferred embodiment of the invention.

In the drawings:

Figure 1 is a plan view of one of the Y branch fittings;

Fig. 2 is a side elevational view of the same fitting;

Fig. 3 is a detail end sectional view taken on line 3—3 of Fig. 1 and showing the manner in which an associated run of conduit is secured in place in the branch fitting;

Fig. 8 shows a double Y fitting comprising two of the fittings shown in Fig. 1 but with one Y branch disposed to dip under a duct passage of an adjacent duct which pertains to a related fitting;

Fig. 9 is an end view taken on lines 9—9 of Fig. 8 and looking in the direction of the arrows;

Fig. 10 is a detailed transversely sectional view taken on lines 10—10 of Fig. 8;

Fig. 11 is a side elevational view of the fitting shown in Fig. 8;

Fig. 12 is a sectional view taken on lines 12—12 of Fig. 8;

Fig. 13 is a sectional view taken on lines 13—13 of Fig. 8;

Fig. 14 is a plan view of a complete floor system wherein the Y branch fittings are employed.

Figure 4:
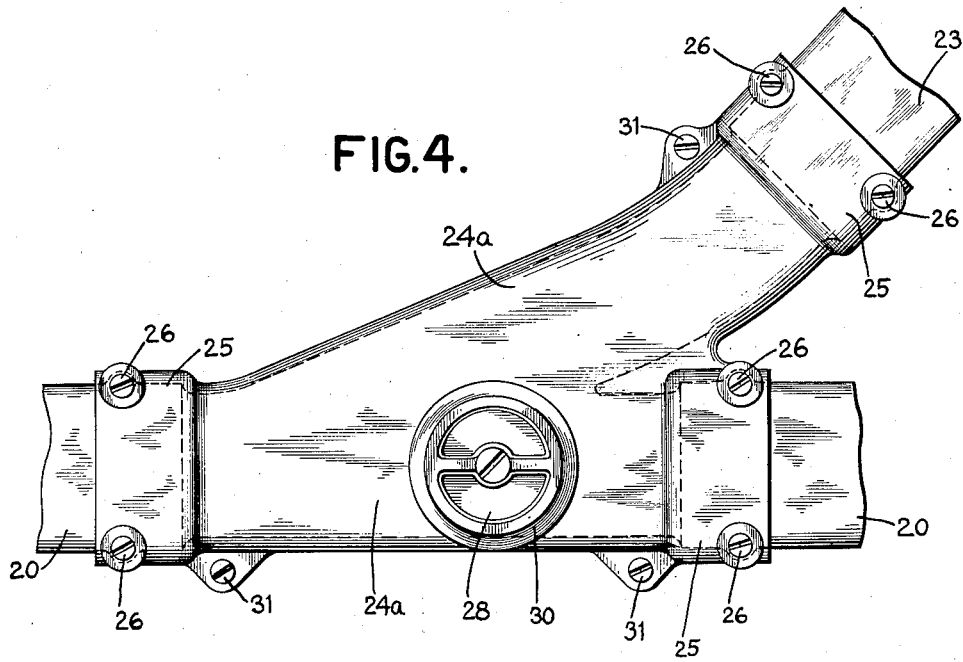
Fig. 4 shows a Y fitting which is generally similar to the fitting shown in Fig. 1 except that the branch angle is 45 degrees instead of 90 degrees.

In more detail with reference to Fig. 14, the floor system includes ducts or conduits 20 which are disposed in the floor and provided with plugs 21 adapted to form outlet openings through the concrete. The construction of these conduits or ducts and the arrangement of plugs is that shown in my Patent No. 1,945,707, issued Feb. 6, 1934. 22 represents conduits which extend at right angles to the conduits 20 and which if desired may extend into proximity to the wall of the room or into proximity to columns and there be extended upwardly to convenient outlet boxes on the wall or on the columns. 23 represents a conduit which extends at substantially 45 degrees to one of the conduits 20.

In lieu of providing floor junction boxes to connect conduits 20 with right angle conduits 22, branch fittings of Y type are provided. Certain of these branch fittings are single Y's, others are double Y's extending to the right and left and others are double Y's extending in one direction as will hereinafter be explained.

Referring to Fig. 14, 24 represents a single Y fitting which will now be more specifically described with reference to Fig. 1. This fitting 24 comprises a casting with a Y branch extending therefrom and with three female couplings generally designated 25. All of the various fittings shown in Fig. 14 are provided with similar couplings and accordingly similar reference numerals 25 will apply to all of such fittings.

To retain the conduits 20 and 22 in place, set screws 26 are provided which set screws are adapted to cooperate and clamp the conduit in the manner shown in Fig. 3, that is, each set screw has a conically tapering lower end which abuts the curved corner portion of the conduit. Preferably with the fittings shown in Fig. 1, four set screws are provided, two at the top and two at the bottom, which enables the complete fitting 24 to be reversed or turned up side down. The fitting 24 is also provided with double tapped openings 27 adapted to receive plugs 28 and 29. Plug 28 when removed provides for access to the interior of the Y fitting and provides for fishing in a reverse direction through the passage of Y branch. In other words, the usual wires would be introduced through 22 through the Y branch and then would pass into the conduit 20 at the left. When wires are introduced in this manner the plug 28 is unnecessary. However, if attempt be made to fish from 20 at the right through the branch on 24 and into 22 the installer would remove plug 28 and when this plug is removed the fished wire could be directed backwardly into the Y branch so as to emerge through conduit 22. It will also be appreciated that the plug 28 can be removed to provide an outlet opening through which an extension fitting can be applied. Should the fitting shown in Fig. 1 be reversed, that is turned up side down, the blanking off plug 29 would be removed and replaced with plug 28. 29 would then be placed in the lower tapped opening 29.

To prevent ingress on concrete to the threads preferably rubber rings 30 are provided. To level up the branch fitting 24, the fitting is tapped to receive three adjusting screws which are designated 31. The use of these adjusting screws enables the fitting to be levelled up to be properly aligned with the conduits which are to be entered therein.

Figure 5:
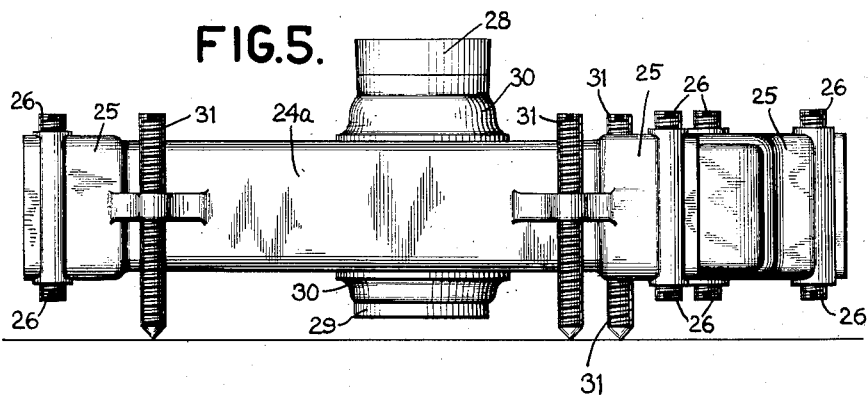
Fig. 5 is a side elevational view of the fitting shown in Fig. 4.

The fitting 24a (see Figs. 14, 4 and 5) which is used with a conduit such as 20 is to be connected with a conduit 23 which extends at 45 degrees to 20, is substantially the same as Fig. 1, except that the Y branch extends at a 45 degree angle instead of extending at a 90 degree angle as is the case with the fitting shown at 21. In this figure, substantially the same parts are provided and accordingly they will all be given corresponding reference numerals so that description of the same need not be repeated.

Figure 6:
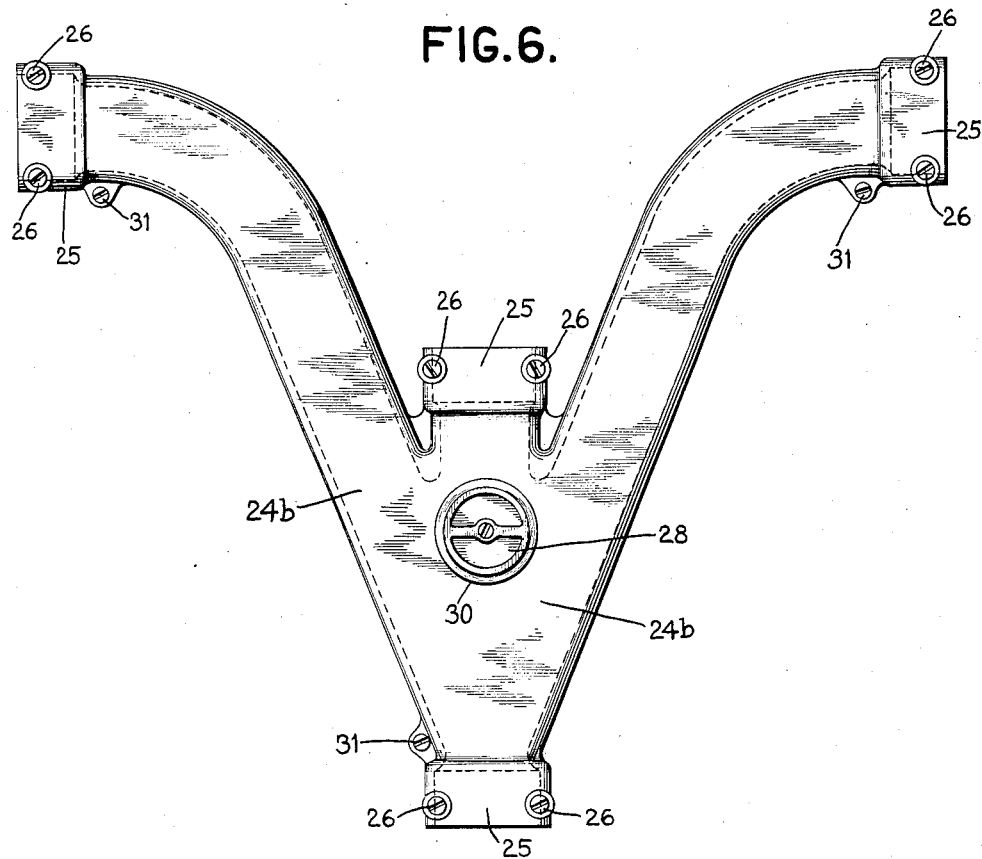
Fig. 6 is a view of a double Y fitting which is substantially similar to the fitting in Fig. 1 except that an additional Y branch is provided.
Figure 7:
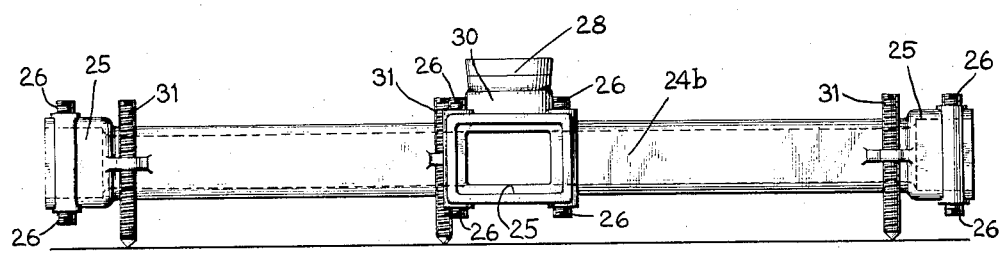
Fig. 7 is an elevational view of the fitting shown in Fig. 6.

Referring now to Figs. 6, 7 and 14 here there is shown a double Y branch fitting which will be designated 24b. In lieu of providing a single Y branch, two Y branches are provided extending to the right and left. This fitting is likewise a reversible fitting but in reversing it due to a double Y construction, it is not necessary to turn it up side down, but on the contrary it is merely turned end for end. Accordingly, the lower plugs 29 can conveniently be dispensed with. In other respects the fitting is the same as the fittings previously described, i. e. it is provided with female couplings 25, four such couplings being here provided in lieu of three as heretofore. It is also provided with conduit or duct clamping set screws 26 and with three levelling studs 31. It is likewise provided with a single upper plug 28.

Referring now to Figs. 14 and 8 to 13 inclusive, in some cases it may be desirable to branch at right angles from two adjacent runs of conduit. In this case one branch from the most remote conduit must extend under the duct passage of the other adjacent conduit. In such cases the branch fitting 24c is employed. This fitting is in its broad respect substantially a duplicate of the fitting shown in Fig. 1 and in broad respects comprises substantially two of the fittings shown in Fig. 1 associated together in one casting. The fitting 24c is provided with six female couplings 25, with the usual set screws 26, with three levelling studs 31 and with two of the upper plugs 28. As shown in Fig. 12, the diverting branch 33 extends under the adjacent duct in the fitting. In order to minimize slightly the over all height of the fitting the adjacent duct is elevated somewhat as will be clear from Fig. 11 (see reference character 34). When the adjacent duct is thus elevated as indicated at 34 in Fig. 11, the entrance portions of the duct are slightly inclined as indicated at 35 in Fig. 12. The branch duct 33 also slopes gradually upwardly to the female coupling outlet as indicated by reference character 36 in Fig. 9 and the other branch duct slopes slightly downwardly as indicated by 37 in Fig. 9.

By the use of the branch fittings herein described, it is possible to provide a floor system in which fishing of wires in various directions can be effected without the use of any junction boxes. In this way the unsightliness and expense of these junction boxes is obviated.

All of the various fittings comprise body portions having passages therein, certain passages being aligned to permit connection to the fitting of aligned ducts or conduits. Each of the fittings also comprises at least one Y branch passage which extends to a point at which another duct can be connected to the fitting. This last mentioned duct or conduit extends to an angle to the first mentioned aligned ducts or conduit. Accordingly, by reason of the provision of the Y passage it is possible to fish straight through, either through the aligned ducts and through the intermediate fitting or through the ducts which are at angles to one another and through the intermediate fitting.

I claim:

1. A branch fitting for an underfloor conduit system for connecting pairs of aligned conduit sections and for also establishing individual branching connections from said aligned conduit sections to other conduit sections at an angle to the first mentioned sections, said branch fitting comprising a one-piece hollow member provided with couplings for the various conduit sections and provided with portions defining parallel passage sections and with a pair of branch portions which connect with the aligned parallel passage sections at an acute angle thereto to facilitate the fishing of wires through the branch fitting, one of said Y branching portions having a portion thereof disposed to pass under the adjacent parallel passage in the fitting.

2. The invention set forth in claim 1 wherein a pair of fishing access openings are provided through which fish wires may be introduced into each of the parallel passage portions of the fitting, which access openings are disposed adjacent the junctions of each of the Y branches with the parallel passage portions of the fitting.

L. ALAN SHARP.